United States Patent Office 2,794,834
Patented June 4, 1957

2,794,834

PROCESS OF PREPARING NITRO-N-ALKYL-SULFONANILIDES

David I. Randall, Easton, Pa., and Tellis A. Martin, Evansville, Ind., assignors to General Aniline & Film Corporation, New York, N. Y., a corporation of Delaware No Drawing. Application January 28, 1954, Serial No. 406,894

4 Claims. (Cl. 260—556)

This invention relates to a novel series of N-alkylmethanesulfonanilides and an improved and novel process for preparing same.

More particularly, this invention relates to nitro- and the corresponding amino-substituted N-alkylmethanesulfonanilides and a novel process for preparing these compounds.

One of the objects of the present invention is a process for the preparation of new and useful nitro- and the corresponding amino - N - alkylmethanesulfonanilides. These compounds constitute a further object of this invention.

Still another object of the instant invention is a novel process for the nitration of N-alkylmethanesulfonanilides.

Still a further object of the present invention is a novel process for the reduction of nitro-N-alkylmethanesulfonanilides to produce the corresponding amino-N-alkylmethanesulfonanilides.

Still other objects will become apparent as the invention is described more fully hereinafter.

The nitro- and amino-N-alkylmethanesulfonanilides of the present invention may be represented by the following structural formulae:

(I)

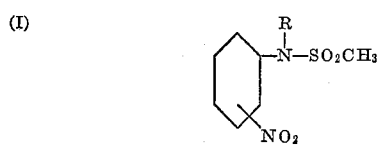

and (II)

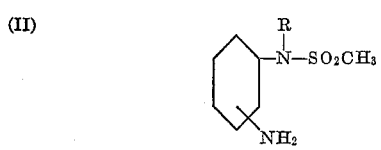

wherein R is a lower alkyl radical such as methyl, ethyl, n-propyl, isopropyl, n-butyl, isobutyl and so forth.

The preparation of these compounds has been effected by first preparing the N-alkylmethanesulfonanilides as described by Marnel et al., J. Am. Chem. Soc., vol. 51, p. 1272 (1929), followed by nitrating to form the mono-nitro derivatives, and finally reducing the mono nitrated product to the corresponding amino compound.

The following series of equations illustrate the course of the reactions:

1.

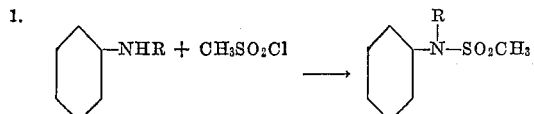

2.

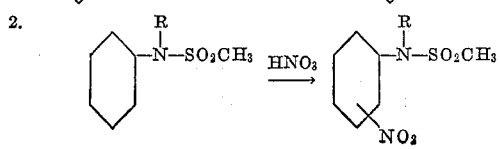

3.

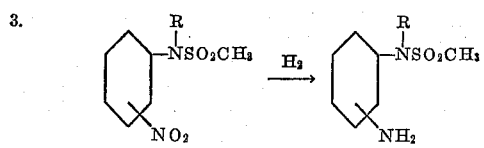

As described above, the first step in the process is well known in the art and consists in the conversion of the secondary amine, that is, the alkylated aniline to the N-alkylmethanesulfonanilide by treatment with methyl sulfonyl chloride.

Examples of suitable amines are:

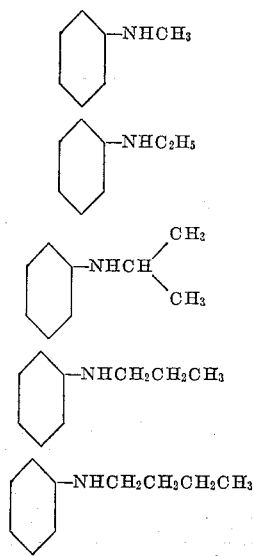

The N-alkylmethanesulfonanilides which are thusly prepared in the first step of our process include:

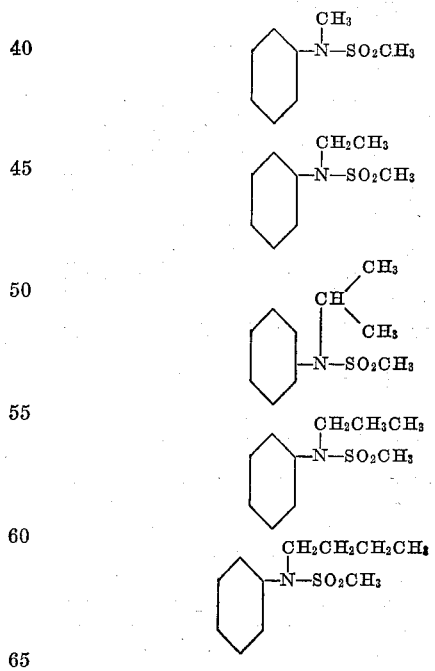

The second step involves the nitration of the N-alkylmethanesulfonanilide to produce the mono-nitro N-alkylmethanesulfonanilide. While the nitration of a sulfonanilide is well known in the art (see Shriner et al., J. Am. Chem. Soc., vol 54, p. 2470, 1932), it was highly unexpected that a high yield of a mono-nitro derivative of an N-alkylmethanesulfonanilide could be obtained in view of the fact that the sulfonanilides of Shriner et al. upon nitration gave rise to dinitro derivatives. The production of the mono-nitro N-alkylmethanesulfonanilides is effected by nitrating the N-alkylmethanesulfonanilides in concentrated sulfuric acid at a low temperature employing a mixture of one-third nitric acid and two-thirds sulfuric acid (by weight) as the nitrating medium.

The compounds produced in the nitration step of the present invention consists chiefly of a mixture of ortho-para-isomers with some meta-isomer also being present.

The third and final step of the process of the present invention involves the reduction of the mono-nitro N-alkylmethanesulfonanilides to the corresponding amino derivatives according to standard procedures. The preferred method for effecting this reduction is by the catalytic hydrogenation method as described in the following examples, which will illustrate more specifically embodiments of the present invention without intending to be limited thereto.

Example 1

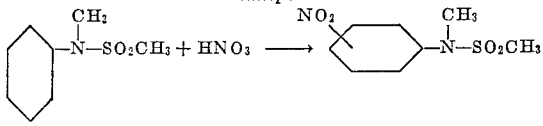

37 parts of N-methylmethanesulfonanilide was added in batches at 0–5° C. and with mechanical stirring to 552 parts of 96% sulfuric acid. After the mixture had been stirred for about twenty minutes, 38 parts of a mixture of one-third by weight $HNO_3$ and two-thirds by weight of $H_2SO_4$ was added (at 0–5° C.) very slowly through a dropping funnel over a period of about 2 hours. After stirring for twenty minutes, the reaction mixture was poured slowly into an agitated mass of 3000 parts of ice-water. The precipitated yellow mass was pulverized, washed and air-dried; yield 39 parts. This yield was recrystallized from 246 parts of ethanol and yielded 32 parts of material which analyzed for one nitro group as follows. The M. P. of the final product was 91–95° C.

*Analysis.*—Calc. for $C_8H_{10}N_2O_4S$: N, 12.15%. Found: N, 12.14%.

Example 2

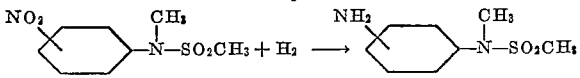

A reaction mixture, consisting of 162 parts of nitro-N-methylmethanesulfonanilide as prepared in Example 1, 475 parts of absolute methanol and 1 part of $PtO_2$ as catalyst, was subjected to 100 p. s. i. of hydrogen until absorption was complete. About 4 hours was required for this reaction. The temperature during this time was 45–48° C. On filtering the cool reaction mixture, 91.5 parts of a colorless crystalline solid was obtained having a M. P. of 100–103° C.

*Analysis.*—Calc. for $C_8H_{12}N_3SO_2$: N, 14.00%. Found: N, 14.17%.

Example 3

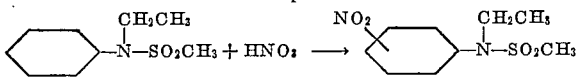

160 parts of N-ethylmethanesulfonanilide was added in batches at —5 to 0° C. and with mechanical stirring to 2944 parts of 96% sulfuric acid. After stirring for thirty minutes or until complete solution had occurred, 148 parts of a mixture of one-third of $HNO_3$ and two-thirds of $H_2SO_4$ was added dropwise (at —5 to 0° C.) over a period of one and one-half hours. After the reaction mixture had been stirred for thirty minutes at —5 to 0° C. and at 0–10° C. for thirty minutes, it was poured into an agitated mass of 12,000 parts of ice-water. On standing overnight the solidified material was collected on a filter, washed neutral and recrystallized from 70% ethanol; yield 130 parts of a pale yellow solid having a M. P. of 94–98° C. Analysis showed the presence of one nitro group.

*Analysis.*—Calc. for $C_9H_{12}N_2SO_4$: N, 11.46%. Found: N, 11.28%.

Example 4

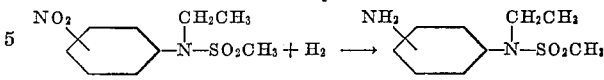

A reaction mixture, consisting of 146.5 parts of nitro-N-ethylmethanesulfonanilide as prepared in Example 3, 475 parts of methanol (absolute) and 1 part of $PtO_2$ as catalyst, was subjected to 100 p. s. i. of hydrogen until absorption was complete. About one hour was required for this reaction. The temperature during this time was 35–40° C. The product was collected on a filter; yield 86 parts of an almost colorless material having a M. P. of 127–132° C. This material upon further recrystallization from either ethanol or water resulted in a product having a M. P. of 130–132° C. and analyzed as follows:

*Analysis.*—Calc. for $C_9H_{14}N_2SO_2$: N, 13.07%. Found: N, 13.00%.

The present invention makes available a valuable series of nitro- and the corresponding amino-N-alkylmethanesulfonanilides. The amino derivatives are particularly valuable as dyestuff intermediates for reaction with anthraquinone to produce acetate dyes. Such anthraquinone dyes are also valuable for obtaining dyeings on other synthetic fibers of the vinyl, polyamide, and polyester type. The amino derivations of the present invention are also valuable as a coupling component for the synthesis of azo dyes.

Although we have described our invention in detail, it will be understood by those skilled in the art that variations may be made without departing from the scope or spirit thereof.

We claim:

1. The process for preparing nitro-N-alkylmethanesulfonanilides of the formula:

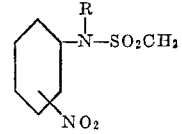

wherein R is a lower alkyl radical which comprises adding to an N-alkylmethanesulfonanilide of the formula

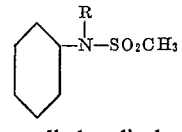

wherein R is a lower alkyl radical, at a temperature of about 0–5° C., a mixture of about 1 part by weight of nitric acid and about 2 parts by weight of sulfuric acid and isolating the resulting mono-nitro compound.

2. The process of claim 1 wherein the mixture of acids is added over a period of about two hours.

3. The process of claim 1 wherein R is a methyl radical.

4. The process of claim 1 wherein R is an ethyl radical.

References Cited in the file of this patent

UNITED STATES PATENTS 2,663,732    Weissberger _____ Dec. 22, 1953

OTHER REFERENCES

Houben: Die Methoden der Org. Chem., vol 2, pp. 389–390 (1943).

Houben: Die Methoden der Org. Chem., vol. 4, pp. 178–180 (1944).

Shriner et al.: J. Am. Chem. Soc., vol. 54, pp. 2470-4 (1932).

Morgan et al.: Chem. Abstracts, vol. 4, p. 1036 (1910).

Terent'ev et al.: Chem. Abstracts, vol. 32, p. 2519 (1938).